Aug. 4, 1970  K. HABFAST  3,522,429
DEVICE FOR THE MEASUREMENT OF THE ION CURRENT REACHING THE
PHOTOGRAPHIC PLATE OF A PARTICLE SPECTROSCOPE USING
MASS SEPARATION BY A MAGNETIC FIELD
Filed Sept. 13, 1967
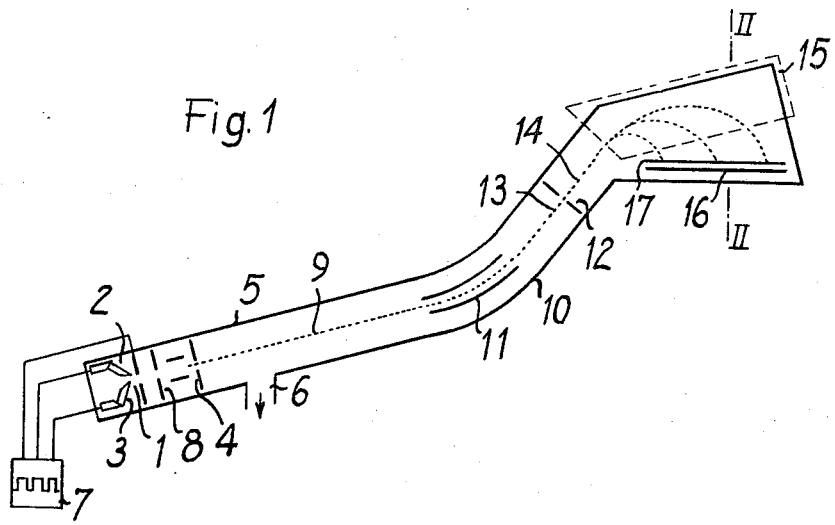
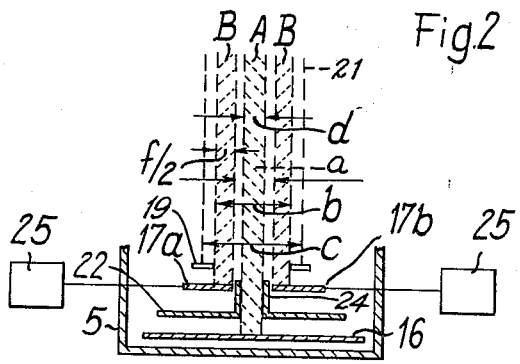
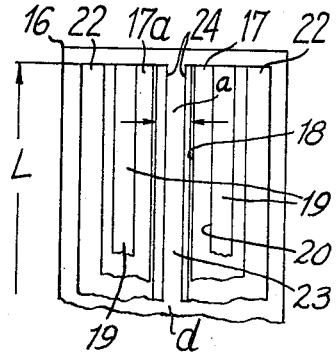
INVENTOR
KARLEUGEN HABFAST
BY Wolf, Greenfield and Hicken
ATTORNEYS

United States Patent Office 3,522,429
Patented Aug. 4, 1970

3,522,429
DEVICE FOR THE MEASUREMENT OF THE ION CURRENT REACHING THE PHOTOGRAPHIC PLATE OF A PARTICLE SPECTROSCOPE USING MASS SEPARATION BY A MAGNETIC FIELD
Karleugen Habfast, Bremen, Germany, assignor to Varian Mat GmbH, Bremen, Germany, a limited company
Filed Sept. 13, 1967, Ser. No. 667,476
Claims priority, application Germany, Sept. 16, 1966, B 88,947
Int. Cl. H01j 39/34
U.S. Cl. 250—41.9     5 Claims

ABSTRACT OF THE DISCLOSURE

The invention provides a device for measuring the ion current reaching a photographic plate in a particle spectroscope, the device comprising a diaphragm disposed between a magnetic field of the spectroscope and the photographic plate and extending over the entire operative length of the photographic plate, the diaphragm being connected to an ion current measuring means.

---

The invention relates to a device for the measurement of the ion current reaching the photographic plate of a particle spectroscope using mass separation by a magnetic field, with the aid of a measuring interceptor in the form of a diaphragm interposed in the path of the ion stream to the photographic plate, and an ion current measuring device connected thereto.

In the known arrangements of this kind, the measuring interceptor is provided at a region of the ion path at which the ions have not yet been separated in accordance with masses, that is to say before the magnetic deflection field. The measuring interceptor masks out a portion from the ion stream which has not yet been separated according to masses, and this portion is used as a measure for the ion current reaching the photographic plate. Thus, the preliminary requirement exists that the partial current allowed through by the measuring interceptor is identical with that reaching the photographic plate and used for making the spectrogramme, or is proportional to this, so that the ratio of the partial current masked out by the measuring interceptor, referred to below as measuring current, to the partial current allowed through, can serve as an accurate measure for the magnitude of the ion current reaching the photographic plate, referred to below as the spectrogramme current.

Actually, these requirements are only approximately satisfied with the known arrangements. In order to ensure proportionality between the measuring current and the spectrogramme current, a number of conditions have to be satisfied by the ion current, e.g. the constancy of the relative energy spread of the ions, the constancy of the radial and axial angular distribution and the constancy of the charge distribution over singly and multiply charged ions. In practice, these conditions can only be satisfied to a certain degree. Moreover, avoidance of non-constancy requires a more or less heavy expense on precision correction means, and is generally connected with a reduction of the total ion current.

The present invention is based on the consideration that the inaccuracies of measuring, which are caused by the non-constancy of the relative energy spread, the angular distribution and the charge distribution, are directly dependent on the length of the ion transition path, over which these on-constancies act. The inaccuracies must therefore be smaller, the shorter the ion transit path is from the measuring interceptor to the spectrogramme plane.

Proceeding from this consideration, it is an object of the invention to avoid or reduce the inaccuracies of measurement as a result of the said non-constancy of the ion current, this being effected according to the invention in that the measuring interceptor is arranged between the magnetic field and the photographic plate and extends over the entire length of the photographic plate which is utilised for production of the spectrogramme, in order to obtain a measuring current which is proportional to the spectrogramme current.

The accuracy of the measurement can be further increased if a slotted diaphragm is provided between the magnetic field and the measuring interceptor, which intercepts ions coming from the vicinity of the pole surfaces producing the magnetic field. The known use of such a diaphragm at the ion-output region of the magnetic field has the advantage here that it acts equally on the measuring current and the spectrogramme current.

In order to reduce disturbing retroaction of the charge received by the photographic plate, on the field distribution in the vicinity of the measuring interceptor, an earthed screening electrode may be arranged between the photographic plate and the measuring interceptor.

The measurement of the partial current intercepted by the measuring interceptor is basically possible in two ways. Firstly, it can be measured with the aid of a direct current amplifier, the voltage appearing at the output of this amplifier being inegrated wih respect to time for obtaining the charge reaching the photographic plate during the exposure time. The voltage time integral measured in this way is proportional to the charge of the measuring current and thus also to the charge of the spectrogramme current.

Secondly, the measuring current can be directly integrated by using it for charging a condenser. The voltage on this integration condenser at the end of the exposure interval is then a direct measure for the desired charge of the spectrogramme current. This kind of charge measurement has the advantage that no allowance has to be made for the time constant of a direct current amplifier.

In order to make the invention clearly understood, reference will now be made to the accompanying drawings which are given by way of example and in which:

FIG. 1 diagrammatically illustrates a spectroscope with a device for charge measurement according to the invention, in a longitudinal section;

FIG. 2 is a sectional view through the interceptor system along line II—II of FIG. 1, to a larger scale; and FIG. 3 is a plan view of FIG. 2.

The spectroscope is a magentic field mass spectrograph having a spark ion source 1, and a high mass resolution is achieved by disposing an energy filter in front of the magnetic deflection field.

The specimen to be investigated, e.g. a solid substance in the form of the electrodes 2, 3, is introduced into the high vacuum space 4 of the mass spectograph, which is surrounded by a vacuum-tight housing 5 and connected through a line 6 to a high vacuum pump (not shown). The electrodes 2, 3 are connected to a pulse voltage source 7. By means of an ion optical system 8, not illustrated in detail, ions are drawn from the region of the ion source 1 and pass in the form of an ion bundle 9 into the so-called separation tube 10 of the mass spectrograph. They firstly pass through the electric field of an energy filter 11 provided for achieving a high mass resolution. A part 14 of the ion current 13 coming from the energy filter and if desired defined by a diaphragm 12 them passes into the magnetic deflection field of a sectoral field magnet 15 where in known manner the mass separation is effected by differently strong deflection of the ions of different mass numbers.

At the outlet side of the magnetic field, in the region of the so-called image line, a photographic plate 16 extending over the length of this image line is provided.

The recording of the spectrogramme by photographic plate as an integrating recoding system is always especially advantageous where ion currents are present which fluctuate with time, since with quantitative analysis this generally requires a recording system which simultaneously records all of the analysis constituents. The measurement data is derived from the recording curves of a photometer by which the transparency or the darkening of the individual lines on the photographic plate is measured.

For the absolute determination of the ion frequency, the photographic plate is only very conditionally suitable, so that analysis procedures are used which do not require absolute measurement of the ion frequency.

In general, the photographic plate can be used with success in all cases for obtaining ion information, in which knowledge of frequency relationship of individual ion currents is sufficient for evaluating the analysis.

If the photographic plate is subjected to a change amount $k \cdot E$, then the total particle number $N_g$ which falls on the photographic plate is $$N_g = \frac{K \cdot E}{e}$$

In this, K is the so-called exposure, E is the exposure unit. This exposure unit, which is a multiple of the elementary charge $e$, is in practice so selected that depending on the abundance of lines in the spectrum, the total particle number falling on the photographic plate corresponds approximately to $10^4$ to $10^7$.

If the distribution of the charge over the individual lines of the spectrum remains constant during the exposure time, the particle number for each individual line is proportional to the exposure K. If now the photographic plate is successively irradiated at different regions with a series of stepped particle numbers, each series having a predetermined exposure K allocated thereto, then a sequence of value pairs are obtained for the photometrically evaluable transparency of the photographic plate at the region where the ions impinge, and for the allocated exposure K, which taken together form a relative transparency curve for the respective line of the spectrum. In these value pairs, the transparency magnitudes, as mentioned above, are determined with the aid of a photometer.

For the evaluation, in addition to the transparency values which are photometrically obtained, the exposure K has to be determined. For determining the exposure value K, a separate device is provided for measurement of the charge amount effective in each case for the exposure of the photographic plate. This device operates with a measuring interceptor 17 which is arranged between the field of the separation magnet 15 and the photographic plate 16 and which extends over the entire length L of the photographic plate 16 used for recording the spectrogramme. This measuring interceptor 17 consists of a slotted diaphragm, the slot 18 having a length corresponding to the said length L of the exposure surface of the photographic plate 16, and a breadth $a$. The measuring interceptor 17 is preceded by a slotted diaphragm 19. The slot 20 of this diaphragm has the same length L as the slot 18 of the measuring interceptor 17, and a breadth $b$ which is greater than the breadth $a$ of the slot 18 but smaller than the breadth or thickness $c$ of the ion stream 21 emerging from the field of the separation magnet 15.

Between the photographic plate 16 and the measuring interceptor 17, a screening electrode 22 with a slot 23 of length L and breadth $d$ is provided, which is earthed. The slot 23 in this screening electrode is bordered by a collar 24 which is directed towards the measuring interceptor 17 and which extends into its slot 18. By means of the screening electrode 22 with its collar 24, it is prevented that electric charges on the photographic plate 16 influence the potential on the measuring interceptor 17.

With accurately symmetrical arrangement of the measuring interceptor 17, slotted diaphragm 19 and screening electrode 22, on each side of the slot 18 of the measuring interceptor, regions of the ion current 21 of the same breadth $f/2$, or a total region of breadth $f$ is masked out and is intercepted by the measuring interceptor 17, whereas a central region of breadth $b$ is passed through the slot 23 of the screening electrode 22 and reaches the photographic plate 16.

Asymmetrical electrode arrangements can also be used. For the measurement result, only the ratio of the breadth or strength of the two ion currents, namely the spectrogramme current A and the measuring current B needs to be known. These two currents, are rleated to each other as the width $d$ is related to the width $f$. Thus, if the charge amount which reaches the measuring interceptor 17 during a predetermined exposure time $t$ as a result of the ion current B is measured, then this charge amount is proportional to the charge amount from partial current A used for exposing the photographtic plate 16.

The measurement of the charge amount from the partial current B effected in a measuring device 25 to which the measuring interceptor 17 is connected, by time integration of the measuring current in an integration condenser $C_1$ with an amplifier and voltage measuring device 28 connected thereto. The output voltage U of the amplifier V is proportional to the time integral and is thus a measure for the charge amount.

The two halves 17a, 17b of the measuring interceptor 17 can be insulatedly arranged with respect to each other, and, as shown in FIG. 1, separately connected each to a device 25 for measurement of the charge amount. It is therefore possible to determine certain asymmetries in the arrangement or in the partial ion currents A and B and if desired remove them by correction.

Many modifications and other embodmients are possible. More particularly, the invention may find use with particle sepectroscopes of another kind. The invention has particular significance for arrangements in which ion currents are present which fluctuate heavily with respect to time.

I claim:
1. A device for the measurement of the ion current reaching the photographic plate of a particle spectroscope using mass separation by a magnetic field, the device comprising a measuring interceptor in the form of a slotted diaphragm interposed in the path of the ion current, and an ion current measuring device connected thereto, the said measuring interceptor being arranged between the magnetic field and the photographic plate and being so dimensioned that the slot of said diaphragm extends over the entire length of the photographic plate used for recording of the spectrogramme.

2. A device according to claim 1, wherein between the magnetic field and the measuring interceptor, an additional slotted diaphragm is provided which intercepts the ions coming from the vicinity of pole faces of the magnetic system producing the magnetic field.

3. A device according to claim 1, wherein between the photographic plate and the measuring interceptor, a slotted screening electrode is arranged which lies at earth potential.

4. A device according to claim 3, wherein the screening electrode is provided with a collar which borders its slot.

5. A device according to clami 1, wherein the measuring interceptor consists of two mutually insulated halves which are each connected to a measuring device.

References Cited

UNITED STATES PATENTS 3,192,383  1/1965  Green.

FOREIGN PATENTS 957,117  5/1964  Great Britain.

RALPH G. NILSON, Primary Examiner

A. L. BIRCH, Assistant Examiner